United States Patent [19]

Dalziel

[11] 4,113,207

[45] Sep. 12, 1978

[54] AIRBORNE RESCUE DEVICE

[76] Inventor: David G. Dalziel, 83 E. Laurel Ave., Lake Forest, Ill. 60045

[21] Appl. No.: 833,170

[22] Filed: Sep. 14, 1977

[51] Int. Cl.$^2$ .............................................. B64D 25/02

[52] U.S. Cl. ...................................... 244/137 P; 9/14; 182/137

[58] Field of Search ........... 244/118 R, 118 P, 137 R, 244/137 P, 135 A, 138 R, 136; 43/12, 11; 182/2, 137-140; 9/14; 258/1.2-1.8

[56] References Cited

U.S. PATENT DOCUMENTS

| | | | |
|---|---|---|---|
| 3,039,746 | 6/1962 | Meyers | 258/1.2 |
| 3,227,401 | 1/1966 | Currier | 244/137 R |
| 3,467,346 | 9/1969 | Carson | 244/137 R |
| 3,601,342 | 8/1971 | Piasecki | 244/137 R |
| 3,677,507 | 7/1972 | Kendall | 244/137 R |

FOREIGN PATENT DOCUMENTS

| | | | |
|---|---|---|---|
| 1,535,289 | 6/1968 | France | 244/137 P |
| 2,107,826 | 8/1972 | Fed. Rep. of Germany | 182/2 |

*Primary Examiner*—Galen L. Barefoot
*Attorney, Agent, or Firm*—Robert D. Farkas

[57] ABSTRACT

An Airborne Rescue Device utilizes an inverted trough-like elongated element secured to the underbelly of a helicopter and extending in a forward-like direction. The free end of the trough-like member is pivotably secured to one end of an elongated rod whose length is substantially the same as the trough-like member. A pulley, capable of swiveling 360° is rotatably secured to the other end of the rod-like member. A line, passes through a hole in the underbelly of the helicopter adjacent the fixed end of the trough-like member and in turn passes through the pulley. A removable harness may be secured to the free end of the line passing through the opening in the underbelly of the helicopter and through the pulley. Tension is exerted on the cable at selected times so as to perform a rescue operation on individuals slung directly beneath the opening in the underbelly of the helicopter. At other times, when the rod is extended forward of the trough-like member the removable lifevest is utilized to capture persons to be rescued in a plane substantially defined by the underbelly of the helicopter and at a point substantially forward of the cockpit hereof. The rod may then be returned to its stored position. A slip-like clutch, when slipping slightly, allows the rescued person to fall, in a controlled descent downwardly and outwardly from buildings or other vertical structures from which they are to be rescued. The slip-like clutch is then engaged into a locked position so that the tension forces applied to the line permits the line to be drawn inwardly towards the cabin of the helicopter.

9 Claims, 10 Drawing Figures

14 18 16 36 38 46 44 48 20 40 40 42 50 38c 38a 40c 46c 40b 40a 42c 38b 40a 40b 42a 42b

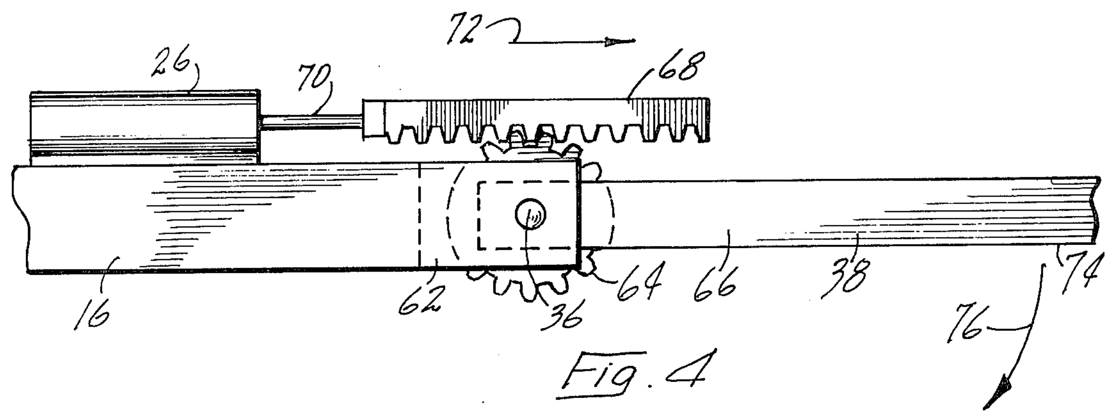
Fig. 4
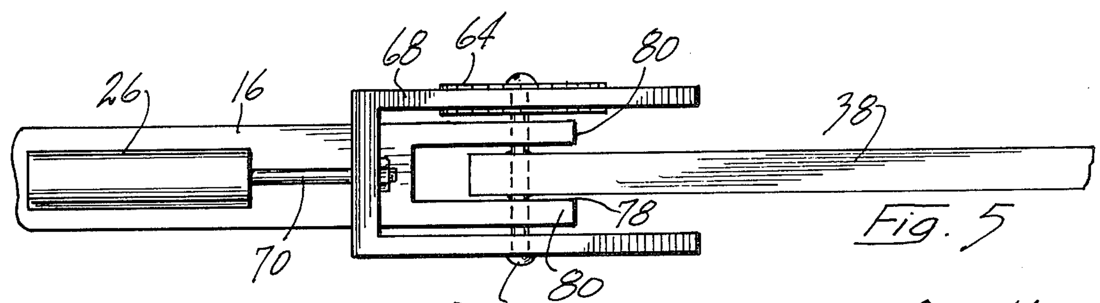
Fig. 5
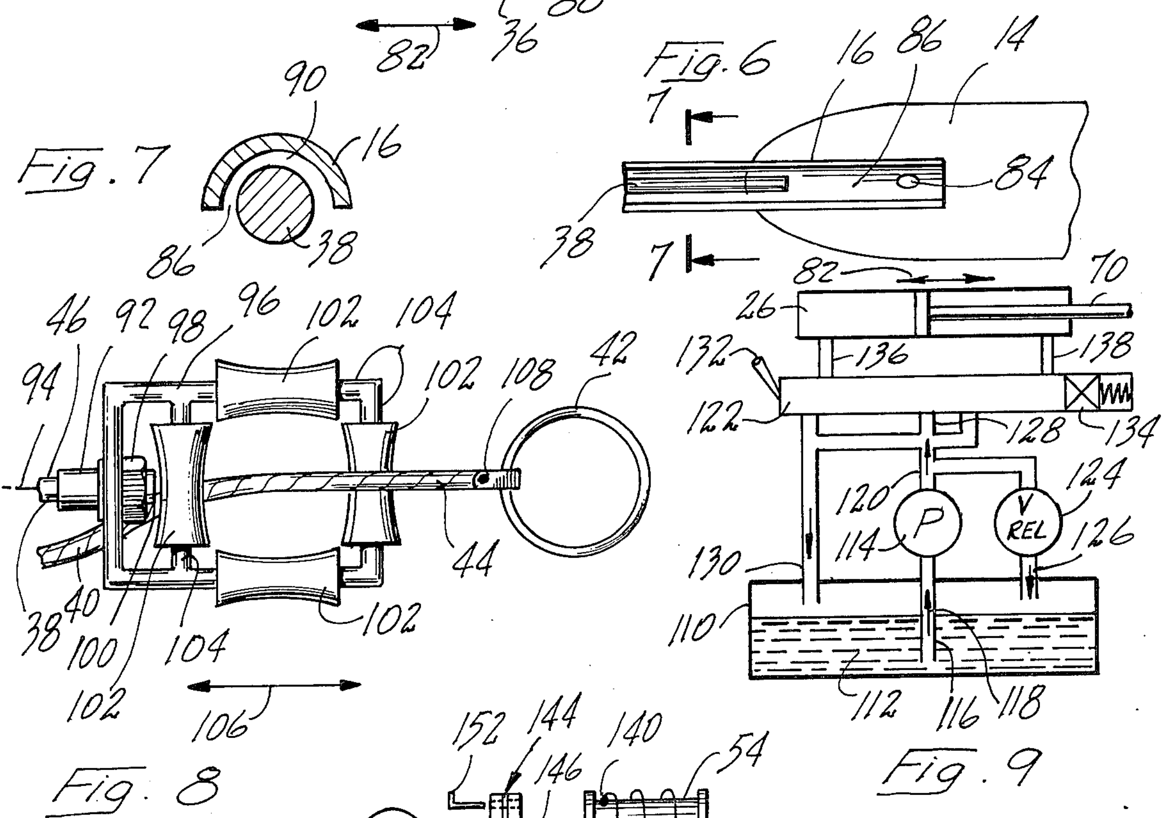
Fig. 7
Fig. 8
Fig. 9
Fig. 10

AIRBORNE RESCUE DEVICE

BACKGROUND OF THE INVENTION

1. The Field of the Invention

The present invention relates to airborne rescue devices and more particularly to that class utilizing rescue slings positioned outwardly and underneath a helicopter whilst being attached to the person to be rescued.

2. Description of the Prior Art

The prior art abounds with helicopters equipped with rescue devices slung downwardly therefrom. U.S. Pat. No. 3,931,868 issued on Jan. 13, 1976 to C. P. Smith, Jr. describes a gandola supported by a helicopter in which the gandola may be stabilized with respect to the exterior wall of a building so that people trapped within the building may be removed from it and safely lowered to the ground. Means are provided for stabilizing the gandola so that the downdraft from the helicopter can be used to control the position of the gandola and other means provided to hold the gandola firmly to the side of the building so the people may easily move from the building to the gandola.

U.S. Pat. No. 3,934,847 issued on Jan. 29, 1976 to P. P Bentivegna describes a helicopter having a fuselage with a floor that has an opening therethrough. A rescue capsule is operably connected to the helicopter by cable and winches and it has a projecting guide member that enters the floor opening to correctly align and stabilize the connection between the capsule to the helicopter. A bridge movably connected to the capsule provides egress between the latter and a building or other structure occupied by persons in need of rescue.

SUMMARY OF THE INVENTION

A primary object of the present invention is to provide a helicopter adapted with a device which initially engages the body of a person to be rescued at a location other than beneath the body of the helicopter.

Another object of the present invention is to provide an air rescue device which permits a person to be rescued to jump, in near free fall condition from the building in which he is situated, so as to cause him to move downwardly and outwardly from the building in a rapid fashion thereby minimizing time in which he is exposed to smoke and flames.

Still another object of the present invention is to provide an air rescue apparatus in which the rescued person is propelled from a position forward of the center of the helicopter to a position centered therebelow so as to permit the rescued person to be lifted straight up towards the helicopter without causing an unbalanced torque force to be exerted on the helicopter.

Yet another object of the present invention is to provide a removable sling positioned at the end of a cable being selectively disposed at a location forward from the cockpit of a helicopter and along the central axis thereof when engaging a person to be rescued, thus enabling the helicopter pilot to maintain his craft a location other than overhead the location of the person to be rescued and clearly visible at all times.

A further object of the present invention is to provide an air rescue device whose weight and complexity of manufacturing is minimal such that most helicopters can be adapted with the device without substantially diminishing flying range or speed or increasing costs.

Heretofore, air rescue devices comprise two basic classes of apparatus. The first class simply consists of a hole located in the underbelly of a helicopter through which a cable passes. The end of the cable, outboard of the helicopter, is attached to a variety of slings or life baskets. In use, this class of rescue device required the helicopter pilot to position the sling or basket and consequently the helicopter itself directly over the person to be rescued, causing on many occasions the pilot to place his craft in peril and minimally to preclude from easy view the location of the person to be rescued. However, this class of device enables a centrally located force to be exerted on the helicopter which did not cause the helicopter to yaw or pitch when lifting the person to be rescued.

Another class of rescue apparatus projected a portion of a rescue cable outboard from the center of the helicopter, usually through a door, vertical hatch or other opening so as to suspend the rescue cable downwardly along a portion of a side of the helicopter. The advantages of this construction permitted th pilot to position his craft at a location other than directly over the person to be rescued whilst creating the disadvantage that the weight of such person when suspended from the cable tended to twist or yaw the aircraft.

The present invention eliminates the aforementioned disadvantage by placing the helicopter at a location other than directly over the person to be rescued whilst allowing the person to be rescued to quickly leave his pick up position and be re-located along a vertical line at the center of gravity of the helicopter, at which time the rescued person may be lifted directly upwardly towards the helicopter above.

These objects, as well as other objects of the present invention will become more readily apparent after reading the following description of the accompanying drawings.

BRIEF DESCRIPTION OF THE DRAWINGS

FIG. 4 is a partial side-elevational view of the housing and the rod at the point at which they are pivotably secured to one another.

FIG. 5 is a plan view of a portion of the apparatus illustrated in FIG. 4.

FIG. 6 is an underside plan view of a portion of the apparatus depicted in FIG. 1.

FIG. 7 is a side-elevational cross-sectional view, taken through lines 7—7, viewed in the direction of arrows 7—7 on the apparatus depicted in FIG. 6.

FIG. 8 is a plan view of the forwardmost end of the rod when in the extended position.

FIG. 9 is a hydraulic diagram of the basic hydraulic component of the present invention.

FIG. 10 is a coupling diagram of the rotational component utilized in the present invention.

DETAILED DESCRIPTION OF THE PREFERRED EMBODIMENT

Figure 1:
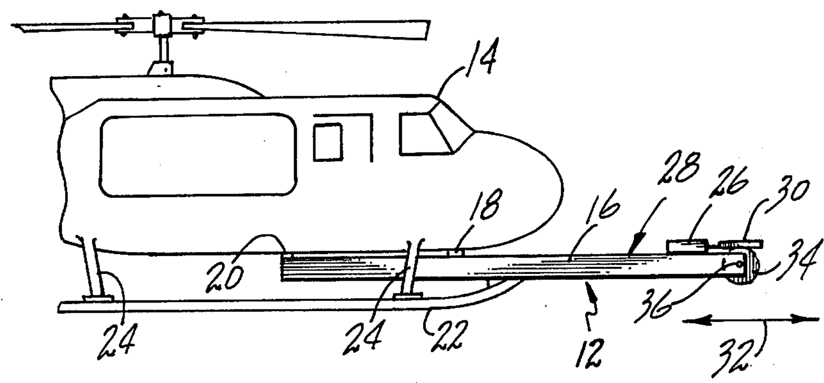
FIG. 1 is a partial side-elevational view of the present invention, shown in a retracted in-flight position mounted to a helicopter.
Figure 2:
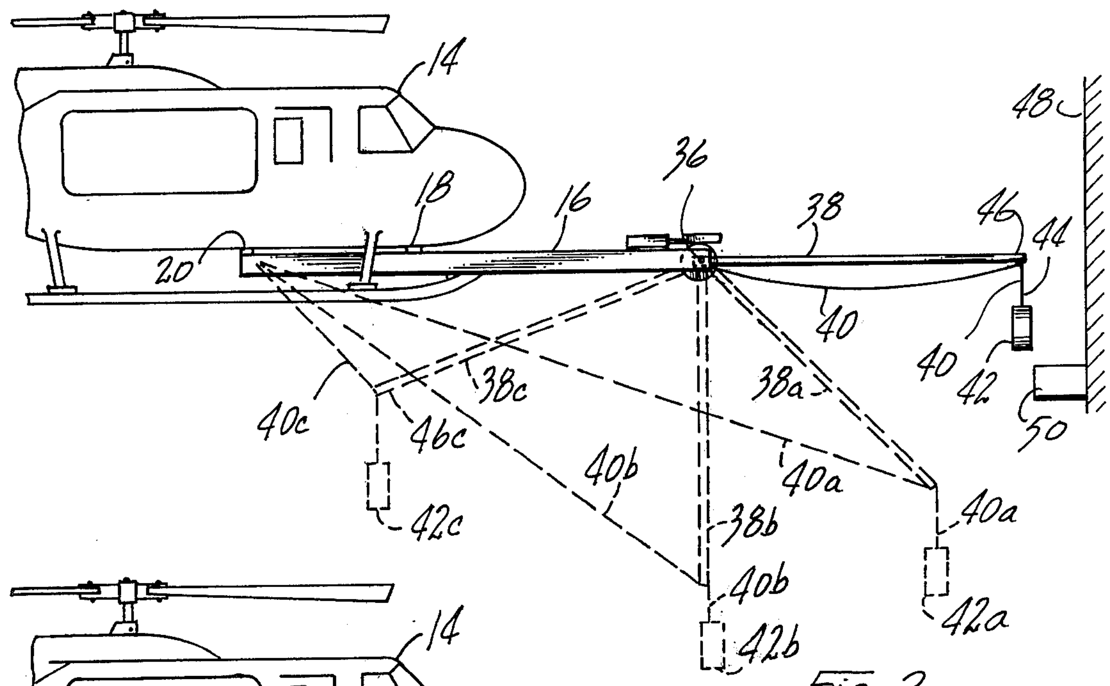
FIG. 2 is a partial side-elevational view illustrating the present invention shown in an extended position when mounted to a helicopter.
Figure 3:
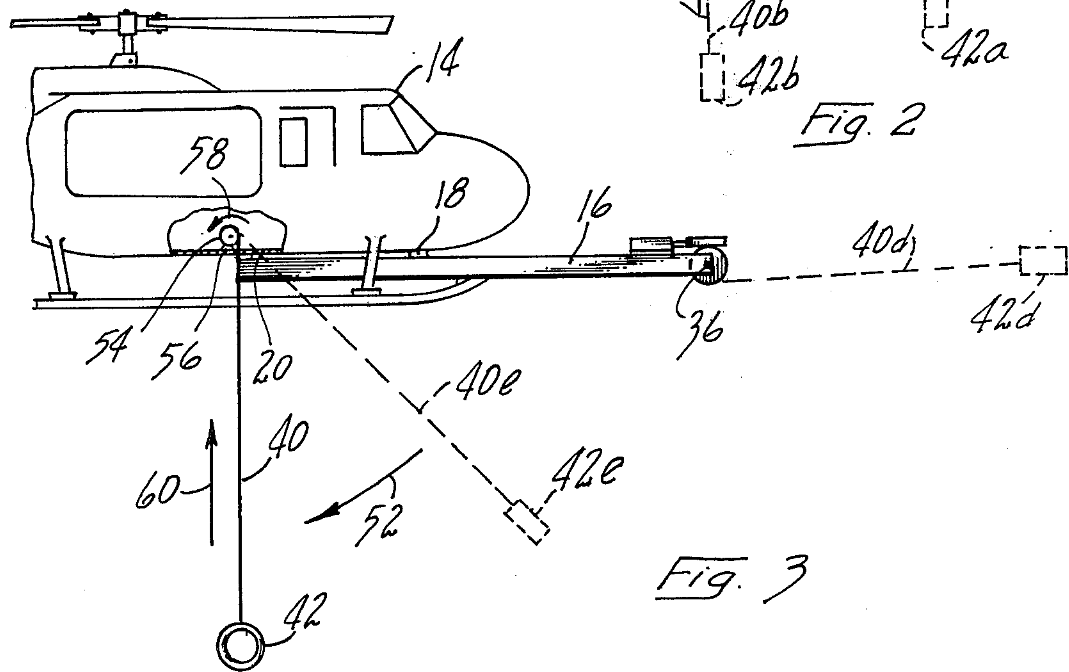
FIG. 3 is a partial side-elevational view of the present invention shown in the stored position, wherein the rescue line is shown suspended downwardly from the supporting helicopter.

Turning now descriptively to the drawings, in which similar reference characters denote similar elements throughout the several views, FIGS. 1 through 3 all state present invention 12 shown mounted to the underside of the exterior portions of a helicopter 14. An elongated housing 16 is supported to the helicopter utilizing blocks 18 and 20. Skids 22, underslung beneath the helicopter body, by struts 24 need not provide support for elongated housing 16, unless it is desired to be so. Block 20 is located substantially along the center of gravity of helicopter 14 in terms of the elongated longitudinal axis, extending for and aft, along the body of the helicopter. Piston 26 is shown mounted on the uppermost surface 28 of elongated housing 16 and operates reciprocating rack 30 in the direction of arrows 32. The operation of rack 30 causes gear 34 to rotate approximately 180°. Gear 34 is rotationally secured to elongated housing 16 by way of axle 36. As shown, the apparatus depicted in FIG. 1, is illustrated in a flight condition. Rod 38 is shown in an extended position, extending forwardly and substnaitally co-axially aligned with elongated housing 16 in an in-use position. In this location, rod 38 carries line 40 having sling 42 fastened to end 44 of the line. The pilot of the helicopter, not shown, can clearly see end 46 of rod 38 and sling 42 when rod 38 is in the extended forward position. In this position the pilot may view a structure 48 upon which a person to rescue may be standing on a shelf or ledge 50. In use, the person to be rescued grasps sling or harness 42 and straps it about his body. The pilot, through the use of controls, not shown, causes rod 38 to move in the direction of arrow 52, whilst the person to be rescued continues to reside standing on shelf 50, such that rod 38 moves to position 38*a*, shown in dotted lines. Sling 42 moves into position 42*a*, if the person to be rescued fails to retain the sling wrapped about his body. For illustrative purposes, sling 42 is shown descending with end 46*a* of rod 38*a*, moving generally in the direction of arrow 52. When rod 38 has moved into its position illustrated by dotted lines 38*b*, sling 42*b* extends downwardly from the center of axle 56. It is to be noted in this position that line 40*b* extending downwardly from end 46*b* of rod 38*b* permits sling 42*b* to be suspended by a portion of line 40*b* now maintained in a vertical direction. As rod 38 continues to move in the direction of arrow 52, rod 38 assumes the position shown by dotted lines 38*c* such that lines 40*b* extend along dotted lines 40*c* which are almost in a vertical position directly beneath block 20. In likewise fashion, sling 42*c* extends downwardly from end 46*c* of rod 38*c*. Further motion of rod 38 permits rod 38 to reside within elongated housing 16 in a horizontal storage position therewithin. Line 40 is now extending directly vertically beneath block 20 such that sling 42 resides suspended by line 40 beneath the center of gravity of helicopter 14. If the person to be rescued continued to maintain sling 42 in a forward position, forward from axle 36, while standing on shelf 50, sling 42*d* and line 40*d* are maintained in a horizontal forwardly extended position wrapped around the body of a person to be rescued. But, the person to be rescued can "jump off" from shelf 50 such that dotted lines 40*d* depicting the line, and dotted lines 42*d*, depicting the sling or harness in a horizontal position, are free to move in the direction of arrow 52 passing through the position depicted by dotted lines 40*e* and 42*e*, continuing on to the position shown by solid lines 40 and 42, as illustrated in FIG. 3. Here, the person to be rescued is now suspended directly below the center of gravity of helicopter 14 such that the winch drum 54, shown journalled about drum support 56, is free to rotate in the direction of arrow 58, causing line 40 and harness 42 to ascend in the direction of arrow 60. Winch support 56 is shown mounted to the floor in the interior of helicopter 14. The person to be rescued has moved along a generally circular arc downwardly and forwardly from the surface of structure 48 in a "free-fall" condition extending along a plane, not shown, passing substantially through the elongated longitudinal axis of helicopter 14, such plane being located in the vertical direction. Thus, there is no side-to-side yawing stresses placed on the helicopter, permitting the pilot of the helicopter to maintain efficient control over the stability of his craft. The person to be rescued, not shown, end up in a position directly beneath the floor of the helicopter and is free to be pulled upwardly by winch drum 54, when in such a position. Alternatively, harness 42, shown in FIG. 3, may be utilized straight in a vertical position while moving along the direction of arrow 60 so as to pull up, in a vertical direction, articles or personnel without utilizing the elongated housing 16 or the rod device 38.

The person to be rescued if never permitted to exert a downward force on end 46 of rod 38, whilst rod 38 is in the extended forward position, as shown in FIG. 2, or in an angularly disposed position intermediate the storage location, as shown in FIGS. 1 and 3, then the weight of the person to be rescued is never placed on rod 38 or elongated housing 16. The major function of rod 38 and housing 16 is to locate harness 42 in a forwardly extending position, relative to helicopter 14 so that the person to be rescued grasps harness 42 in such a position. Immediately afterwards, rod 38 is permitted to pivot downwardly into the vertical position, shown by dotted lines 38*d* and thence into the storage position, as shown in FIGS. 1 and 3. Utilization of this technique maintains line 40, in the position indicated by dotted lines 40*d* as shown in FIG. 3, when harness 42*d* is grasped by or wrapped around the body of the person to be rescued. Only then are there substantial forces exerted upon the line 40 whilst line 40 is arcuately pivoting around the block 20 or whilst line 40 is in a vertical position. The weight and strength of elongated housing 16 and rod 38 may thus be maintained at minimal levels, since the only function of these components is to "place" harness 42 in a forward position. If desired, sling or harness 42 may be permitted to descend radially outwardly from block 20 whilst the sling is arcuately descending downwardly into a vertical position. Thus, the person to be rescued quickly and effectively moves away from shelf 50 clearing the front end of the helicopter with great speed. Furthermore, by allowing line 40 to reel outwardly from drum 54, then sling 42 may be dropped rapidly to a person to be rescued when located directly below block 20. Thus, in both rescue modes, to wit; the rescue mode in which sling 42 is extended forward from blocks 18 and 20 and, the rescue mode when sling 42 is permitted to reside directly beneath block 20, the sling is permitted to extend radially outwardly from block 20 at a rapid rate. Winch drum or reel 54 may be then utilized to pull the person to be rescued upwardly toward the body of the aircraft now located, if desired, at a remote location from the disaster area.

FIG. 4 illustrates the end of elongated housing 16 on which piston 26 is mounted. Axle 36 is shown carrying rod 38, in rotational relationship about end 62 of elongated housing 16. Gear 64 is shown rotatably mounted relative to axle 36 and is non-rotationally affixed to end 66 of rod 38. Rack 68, engages the teeth of gear 64, and is affixed to rod 70 if piston 26. Thus, as rack 68 moves in the direction of arrow 72, point 74 on rod 38 moves arcuately, the direction of arrow 76, and in radial fashion about axle 36, so as to cause end 46, not shown, to first descend downwardly below axle 36 and then upwardly to a leftmost horizontal position, such that the entire length of rod 38 is shown stored within elongated housing 16.

FIG. 5 illustrates housing 16, in plan view having slot 78 therewithin. Axle 36 is journalled to legs 80 such that the axle is free to rotate therewithin. The axle is non-rotationally secured to rod 38, and gear 64. The teeth of rack 68 engage gear 64 permitting gear 64 to rotate and thus to pull rod 38 to pivot rotational about axle 36. Piston rod 70 is free to move in reciprocal fashion in the direction of arrows 82 such that rod 38 pivots in alternate directions about axle 36.

FIG. 6 illustrates the under portion of helicopter 14 in which there is an opening 84. Elongated housing 16 is shown having openings 86 therein, accommodating rod 38, partially shown, which may be stored within housing 16 when in a non-use position.

FIG. 7 illustrates elongated housing 16, having openings 86 therein, in which rod 38 passes so as to reside within cavity 90 formed within elongated housing 16.

FIG. 8 illustrates end 46, as shown in FIG. 2, of rod 38. Sleeve 92 is secured to end 46 of rod 38 and is free to rotate about the longitudinal axis 94 of rod 38. Any conventional means, well known in the art, may be utilized to rotationally secure sleeve 92 to end 46 of rod 38. Frame 96 is secured to sleeve 92 by way of nut 98, used to engage threaded rod 100, a portion of sleeve 92. Thus, frame 96 is also rotationally journalled about end 46 of rod 38. Concave pulley elements 102 are affixed to legs 104 of frame 96, disposed behind a square. Thus, each of the pulley elements 102 are journalled about frame legs 104 and are free to independently rotate thereabout. Line 40 is shown passing over one of the pulley elements and under another such that end 44 thereof is free to move in the direction of arrows 106 at will. Harness 42 is shown removably secured to end 44 of line 40 utilizing a strap fastener 108, secured to an endmost portion of line 40, and having a complementary snap fastener, not shown, fastened to a portion of line 40 adjacent the endmost portion. Thus, sling 42 may be removed from engagement with line 40 when desired.

FIG. 9 illustrates the hydraulic component utilized to operate piston 26. Reservoir 110 contains a quantity of hydraulic oil 112. Pump 114, operated by a motor not shown, causes hydraulic oil to be drawn up, within pipes 116 from reservoir 110 in thd direction of arrow 118. The oil is then free to move in the direction of arrow 118 by entering pipes 120, thence to enter five quart four-way valve 122 or to enter valve 124. Valve 124 may be manually operated so as to cause some of the oil, passing through pipe 120 to re-enter into tank 110 by way of pipe 126. Thus the amount of oil to rivet to input pipe 128, secured to the inlet port of four-way valve 122 to be defrayed back into the tank. This permits a variable amount of pressure to enter four-way valve 122. Pipe 130 carries the discharge oil from the exterior port of valve 120 back into the tank 110. When valve 120 is manually operated by operator 132, body 134 of valve 122 is reciprocated from left to right such that the oil entering and leaving pipes 136 and 138 changes direction, causing piston rod 70 to move alternately and selectively in the directions shown by arrows 82. Thus, the pilot of the craft, or a member of the crew thereof, can cause rod 70 to assume any desired position in a horizontal plane and at any rate of speed desired, by judicious operation of operator lever 132 and valve 124. This in turn controls the operation of rod 38, not shown, disposing same in a stored position within housing 16, not shown, or in a forwardly extending position, when desired.

FIG. 10 illustrates reel or drum 54 shown supported on drum supports 56 and line 40 thereon. End 140 of line 40 is secured to the reel such that adjacent portions of line 40 may be wound up on the reel as reel 54 is rotated by motor 142. Clutch 144 is interposed between shaft 146 and shaft 148, the aperture of motor 142. Thus, when clutch 144, being of the slip clutch variety, is permitted to slip, line 42 is free to move, in unwinding fashion, from reel 54 and generally in the direction of arrow 150. When it is desired to allow motor 142 to exercise complete control line 40, so that there is no relative slippage of line 40 from the position assumed by shaft 146, pin 152 is inserted in plates 154 and 156, of slip clutch 144 so as to lock shaft 146 against further rotation of shaft 148 of motor 142. Motor 142 may be provided with a gear box which prohibits the free rotation of shaft 148 when motor 142 is inoperable. It is to be noted that line 40 passes through opening 84, shown in FIG. 6, so as to emerge from the confines of helicopter 14 also shown in FIG. 6. Thus, personnel aboard the helicopter may completely control the way portions of the line 40 emerge from the helicopter in a stored or locked position, when motor 142 is inoperable, or slipping from the aforementioned drop position when pin 152 is disengaged from plates 154 and 156 to emerge outwardly from the helicopter when pin 152 is engaged within plates 154 and 156 under the complete control of motor 142 as motor 142 rotates or is in a stalled non-rotational position. Thus end 140 is subjected to variable tension forces causing line 40 to be under the complete control of the crew of the aircraft.

One of the advantages of the present invention is a helicopter adapted with a device which initially engages the body of a person to be rescued at a location other than beneath the body of the helicopter.

Another advantage of the present invention is an air rescue device which permits a person to be rescued to jump, in near free fall condition from the building in which he is situated, so as to cause him to move downwardly and outwardly from the building in a rapid fashion thereby minimzing time in which he is exposed to smoke and flames.

Still another advantage of the present invention is an air rescue apparatus in which the rescued person is propelled from a position forward of the center of the helicopter to a position centered therebelow so as to permit the rescued person to be lifted straight up towards the helicopter without causing an unbalanced torque force to be exerted on the helicopter.

Yet another advantage of the present invention is a removable sling positioned at the end of a cable being selectively disposed at a location forward from the cockpit of a helicopter and along the central axis thereof when engaging a person to be rescued, thus enabling the helicopter pilot to maintain his craft a location other than overhead the location of the person to be rescued and clearly visible at all times.

A further advantage of the present invention is an air rescue device whose weight and complexity of manufacturing is minimal such that most helicopters can be adapted with the device without substantially diminishing flying range or speed or increasing costs.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims. The embodiments of the invention in which an exclusive privilege or property is claimed are defined as follows:

I claim:

1. An airborne rescue device comprising:

a. an elongated housing; said housing having an elongated slot therein, said housing fixedly secured at one end thereof to the body of a helicopter;

b. a rod, one end of said rod pivotably secured to the other end of said housing;

c. means to selectively position said rod from a storage position within said housing to an extended position wherein said rod is substantially disposed outwardly and parallel to said housing;

d. a flexible line;

e. means to exert controlled tension forces on one end of said line;

f. a pulley-like device swivelably attached to the other end of said rod, a portion of the length of said flexible line passing over the surface of said pulley-like device; and g. means to independently manually selectively control said positioning means and said tensioning means.

2. The air rescue device as claimed in claim 1 further comprising a harness, secured to the other end of said flexible line.

3. The air rescue device as claimed in claim 1 further comprising a drag-type slip clutch coupled between said tensioning means and said one end of said line.

4. The air rescue device as claimed in claim 1 wherein said housing comprises an inverted trough-like structure.

5. The air rescue device as claimed in claim 4 wherein said trough-like structure extends substantially along the longitudinal axis of said helicopter.

6. The air rescue device as claimed in claim 1 wherein said helicopter includes an opening therein, and adjacent portion of said portion of said flexible line passing through said opening and into said housing.

7. The air rescue device as claimed in claim 1 wherein said pulley-like device includes an opening, said portion of said flexible line passing through said opening.

8. The air rescue device as claimed in claim 7 wherein said opening in said pulley-like device is swivelably secured to said other end of said rod having at least 360° rotationability.

9. The air rescue device as claimed in claim 8 further comprising means for locking together manually selectively said tensioning means of one end of said line, eliminating the drag properties of said drag-type slip clutch.

* * * * *